Dec. 22, 1970   E. G. McMAHON   3,549,445
METHOD OF FORMING A LAMINATE SEALING ELEMENT
Filed Oct. 23, 1964   2 Sheets-Sheet 1
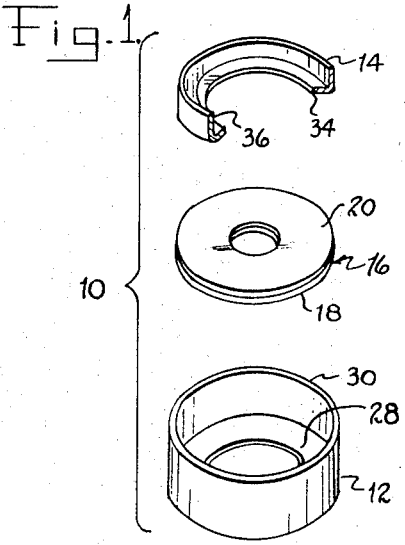
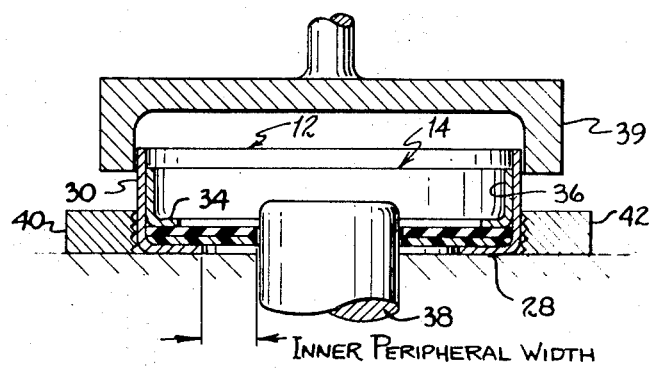
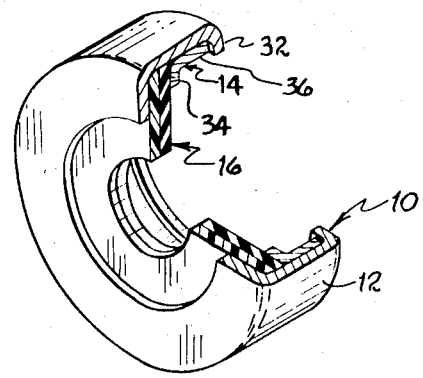
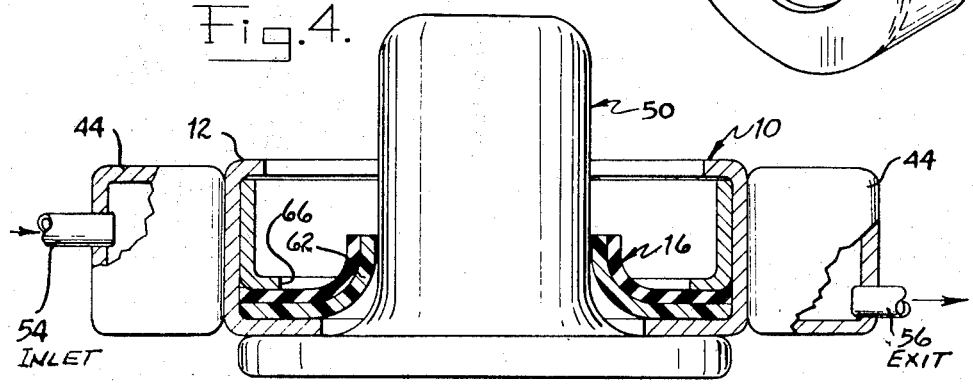
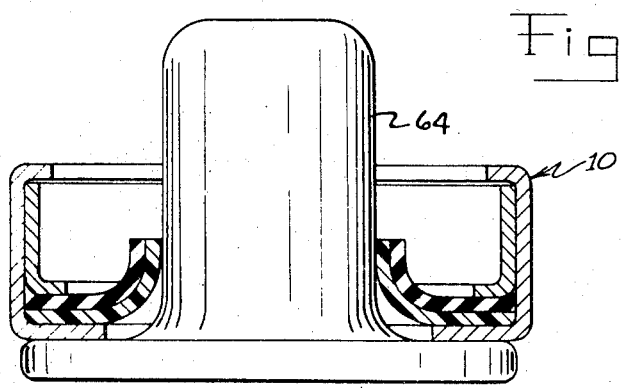
INVENTOR.
EDWARD G. McMAHON
BY
John A. McKinney
ATTORNEY Dec. 22, 1970   E. G. McMAHON   3,549,445
METHOD OF FORMING A LAMINATE SEALING ELEMENT
Filed Oct. 23, 1964   2 Sheets-Sheet 2
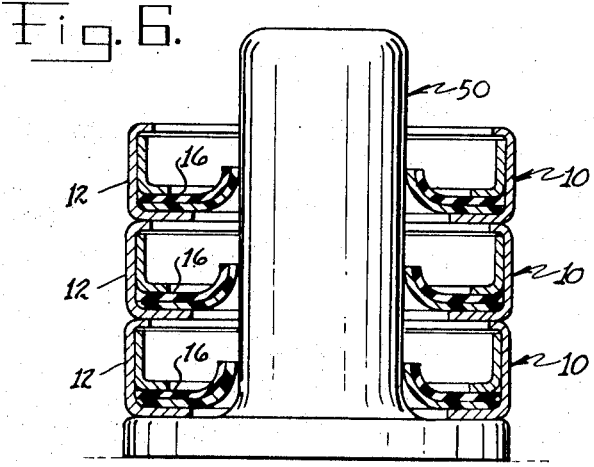
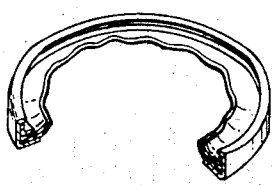
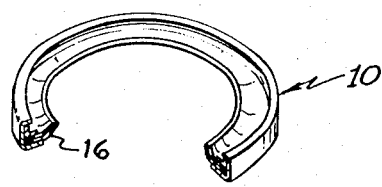
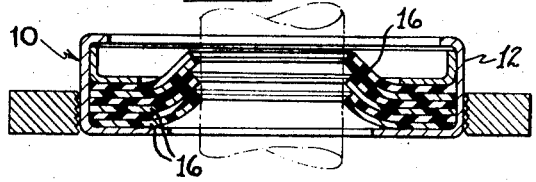
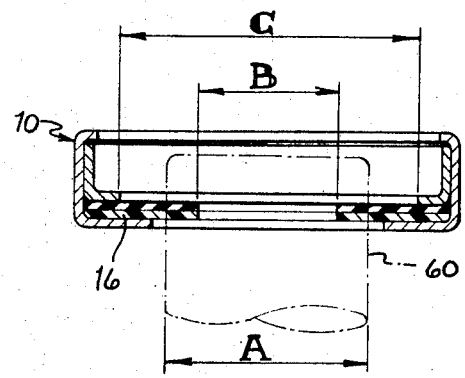
INVENTOR.
EDWARD G. McMAHON
BY
John A. McKinney
ATTORNEY

United States Patent Office 3,549,445
Patented Dec. 22, 1970

3,549,445
METHOD OF FORMING A LAMINATE SEALING ELEMENT
Edward G. McMahon, Somerville, N.J., assignor to Johns-Manville Corporation, New York, N.Y., a corporation of New York
Filed Oct. 23, 1964, Ser. No. 406,074
Int. Cl. B32b 27/06
U.S. Cl. 156—222                                    9 Claims

ABSTRACT OF THE DISCLOSURE

A method for forming an annulus sealing member comprising a laminate of an inert synthetic resinous material such as tetrafluoroethylene polymer bonded to an elastomeric material such as rubber, the method broadly comprising heating the interior peripheral area of the annulus and deflecting the heated area into a cone shape by inserting a male member having a diameter greater than the diameter of the annulus, followed by cooling the deflected annulus while being supported on a male member having a diameter approximately the same as the diameter of a shaft on which the cool annulus will eventually be mounted.

---

This invention relates to an improved method of manufacturing a sealing device and is particularly related to an improved method of manufacturing a sealing device of the type where the sealing element is a composite laminate. More particularly, the invention is related to an improved method of forming a laminate sealing element secured in a rigid casing.

The invention has particular applicability to the manufacture of sealing devices of the type, and is an improvement over the method of manufacture, disclosed in the commonly assigned application, entitled "Seal and Method of Manufacture," of A. A. Mastrobattista et al., Ser. No. 246,549, filed Dec. 21, 1962 and now issued U.S. Pat. No. 3,275,331.

As disclosed in said application, such seals embody a laminated annulus comprising a lamina of synthetic resinous material and a lamina of elastomeric material. In the preferred embodiment, the laminated annulus is provided with a dished or conoidal portion at its inner periphery, which portion is adapted to engage a member to be sealed.

Prior to this invention, such seals were made by shaping the conoidal portion with a "cold coining," per se, operation. In many instances, the shaped laminate annulus was not satisfactory because of the wrinkles produced in the shaped portion. Furthermore, the residual stresses imposed on the synthetic resinous portion, coupled with the natural resiliency of elastomeric back-up lamina, tended to revert, prematurely and unduly, the synthetic resinous lamina to its original flat shape. In addition, the conoidal shapes were formed before the laminates were inserted within the rigid outer casing and hence it was difficult to obtain the desired alignment of the sealing element with the members to be sealed.

It has been suggested heretofore, to perform annuluses of synthetic resinous material for use as sealing elements. However, in each case the annuluses, per se, have been formed or shaped as opposed to being shaped while in combination with an elastomeric material. While the reasons for this are not known for every case, one of the chief reasons is that the temperatures considered to be necessary to form the synthetic resinous materials were considered to be detrimental to elastomer materials.

An object of this invention is to provide an improved method of manufacturing laminate sealing elements which will obviate the problems referred to above.

A further object of this invention is to provide an improved method of forming synthetic resin and elastomeric laminate annulus sealing elements which will deter the tendency for the synthetic resin to revert to its original preformed shape.

A still further object is to provide an improved method of manufacturing a sealing device embodying annular elements whereby the device is simple to fabricate and assemble and concentricity of the elements is maintained.

Another object is to provide an improved method of manufacturing a sealing device embodying a synthetic resin and elastomeric laminate annulus whereby the synthetic resin element is subjected to elevated temperatures, while combined with the elastomeric element, but without deleteriously affecting the elastomer.

To accomplish the stated objects, the novel method of manufacturing sealing devices of this invention embodies forming a laminated annulus comprising a lamina of inert synthetic resinous material and a lamina of elastomeric material. Preferably, the annulus is in the form of washer die-cut from a laminate layer wherein the resinous and elastomeric materials are adhesively secured. A laminate is preferably encased by a casing of rigid material, such as metal, which casing is adapted to fixedly position the sealing device in a chamber between relatively moving parts to be sealed. One or more of the laminate annuluses, together with their respective and corresponding casings, where casings are employed, are subjected to heat such as by positioning over a heated mandrel or male member, to preferentially heat and soften the inner peripheries or female portions of the synthetic resin laminae. The mandrel may also serve to deflect and form said portions into a conoidal shape. The heat also serves to reduce the elastic memory of the synthetic resinous material and thus the tendency to revert back to the shape before forming. The annuluses are then immediately removed from the heated mandrel and transferred to a relatively cold pin which cold pin burnishes or irons out any wrinkles on the formed conoidal portions and the resin material is permitted to cool sufficiently to set. The limited exposure of the elastomeric material to the heat employed to soften the synthetic resin material, the temperatures employed, the time cycles, and the deterring of residual heat in the metal casing form some of the important aspects of this invention and will be discussed hereinafter in greater detail.

The present invention obviates the disadvantages attendant to synthetic resin sealing annuluses which are coined or formed prior to adhering to an elastomeric back-up member. The simultaneous deformation or deflection of the resin lamina and of the elastomeric lamina in the present invention assures a conformation of the conoidal configurations and hence the desired uniform apllication of pressure by the elastomeric member upon the resin member when the sealing element is in service.

The invention will be more fully understood and further objects and advantages thereof will become apparent when reference is made to the following detailed description and to the accompanying drawing in which:

FIG. 1 is an "exploded" pictorial view of the components of one embodiment of a sealing device which may utilize the method of this invention;

FIG. 2 is a cross-sectional view of the components of FIG. 1 but shown in assembled relation in conjunction with suitable positioning means and crimping means for securing the components together;

FIG. 3 is a fragmentary pictorial view showing the complete assembly secured together;

FIG. 4 is an elevational view of a heated mandrel in conjunction with a sealing assembly and illustrating the initial conoidal forming operation;

FIG. 5 is an elevational view of a cold mandrel in conjunction with a sealing assembly after being removed from a heated mandrel and illustrating the final conoidal forming opeartion;

FIG. 6 is an elevational view of a series of sealing devices in conjunction with a heating mandrel;

FIG. 7 is a cross-sectional view of a healing device utilizing a laminate sealing element formed by merely "cold coining" illustrating the manner and degree to which the sealing element tends to revert to its original flat shape and to buckle;

FIG. 8 is a cross-sectional view of a sealing device fabricated according to the method of this invention and illustrating its uniform configuration;

FIG. 9 is a cross-sectional view of another form of sealing device, which may utilize the method of this invention, wherein a plurality of laminate annulses are incorporated in a single casing; and FIG. 10 is a view of a seal assembly, before forming of the laminate sealing element, superimposed upon a shaft to be mounted by the seal and showing certain dimensional relations between seal assembly and the shaft.

Referring to FIG. 1, there is shown a cartridge-type sealing device, generally designated by the numeral 10. The sealing device 10 as thereshown incorporates two principal elements: an annular casing 12, preferably of rigid material, such as metal, and which may optionally include a retention member 14; and a laminate sealing element 16 comprising a first annulus 18 and a second annulus 20. The first annulus 18 is inert synthetic resin material, preferably one having a low coefficient of friction (.01–.3) such as fluorocarbon, of which polymerized tetrafluoroethylene sold under the trade name "Teflon" is exemplary. The second annulus 20 is elastomeric material, such as rubber or rubber-like materials, and particullarly those which are characteristically resilient.

In a preferred embodiment of the invention, the sealing element 16 is stamped from a composite or laminate sheet comprising a layer of inert synthetic resin material and a layer of elastomeric material adhered together by suitable means, such as by bonding or cementing. Of course, the particular method employed to adhere the layers together will be largely contingent upon the particular materials used. The interior diameter of the annulus 16 is less than the diameter of the shaft to be mounted to provide sufficient material to form the dished portion 62, hereinafter described.

One or more of the laminate sealing elements 16 are inserted in the annular casing 12 against the radial rim 28 and then a portion of the axial rim 30 may be rolled over to form another radial rim 32 for retaining the elements 16 in axial compressed conditon. Preferably, as shown in FIG. 2, a retention member 14, having radial leg 34 and axial leg 36, is positioned in the casing 12 with the sealing element 16. The axial rim 30 is rolled over the axial leg 36 by forming tool 39 to secure the sealing elements 16 in position. In order to facilitate concentric positioning, the sealing element 16 may be positioned over a central positioning member or mandrel 38. A pair of vice or gripping members 40 and 42 are preferably provided to retain the casing 12 in coaxial relation with the sealing element 16 during the crimping or rolling step.

The next step is to clamp one or more of the sealing device assemblies 10 in suitable holding means such as vice 44 in readiness for the initial forming or softening of the annulus 18. The vice 44 is positioned to receive, with the sealing device 10 mounted therein, an insertable male member in the form of a heated pin or mandrel 50. It will be understood that the pin 50 may be stationary and that the vice 44, together with one or more sealing device assemblies 10, may be slidably positioned over the pin 50.

The pin 50 is preferably an electrical resistance heated element and forms a convenient means for simultaneously heating and deflecting the annulus. It will also be understood that the pin 50 and/or the annulus 18 may be heated by any other suitable means, as by induction heating, by gaseous heat, or by a radiant heat source such as a quartz lamp, or any other source which may preferentially direct the heat to a laminate in a manner to be described hereinafter. An important aspect of the heating step is to provide means for concentrating heat to the inner peripheral width of annulus 18.

The application of heat is preferentially directed to the inner periphery of the laminate 16, that peripheral area out of physical contact or out of contiguous engagement with the metal casing 12 or retention member 14. The heat is also, most preferably, directed to the synthetic resin portion 18, as opposed to elastomer portion 20. Consequently, a heated mandrel 50 is inserted through the synthetic resin end of the laminate 16 first so as to engage the synthetic resin lamina 18 and deflect the elastomer 20 out of contact is preferred to other devices which simultaneously direct heat to both elements 18 and 20.

Generally the temperature, to which the inner peripheral width or area of the laminate 16 is subjected, is in the range of 250° to 500° F., or that sufficient to soften the synthetic resinous material 18 and reduce its elastic memory. When fluorocarbon material is employed the preferred temperature is in the general order of 450° F.

The laminate 16 is subjected to such heat for at least fifteen seconds and preferably for a period in the general order of sixty seconds. The time/temperature exposure must be sufficient to slightly soften the synthetic resinous material 18 and so that any wrinkles may be "ironed out" but yet not so long as to unduly transfer heat to the metal casing 12 or retention member 14.

If too much heat is transferred to the metal, and if the heat is not in turn transferred away from the seal assembly 10, the metal will function as a "heat sink." Subsequently, after the seal assembly 10 is removed from the mandrel 50, heat from the "heat sink" will be transferred back to the synthetic resinous material 18 and tend to soften the same sufficiently so that the laminate 16 will not retain the imparted conoidal shaped portion.

In the fabrication of the smaller diameter seal assemblies 10, those designed to be mounted on shafts 60 (FIG. 10) having a diameter of one-half inch or less, the time-temperature exposure of the laminate 16 is usually low so that insufficient heat is transferred to the metal casing 12 to pose a serious problem. It is noteworthy that the disclosed technique of forming the laminate annulus 16 without completely enclosing the laminate 16 or the seal assembly 10 (such is done in closed-mold or pressing operations), also contributes to the dissipation of heat and reduced heat transfer to the metal casing 12. It is also to be noted that the laminates 16 need not be confined by forming dies and that little or no pressure is required as in some prior techniques, to coin the conoidal portions.

However, in the fabrication of larger diameter seal assemblies 10, where the time-temperature exposure of the laminate 16 is such that there exists a tendency for heat to be transferred to the metal casing 12 and retention member 14, means are provided for transferring the heat away from the metal. A first heat exchange means comprises fluid coolant circulated through the vice means 44. Water or other coolant is introduced through inlet pipe 54 and discharged through exit pipe 56. A second means comprises a heat exchanger (which may also form the vice means 44) in contiguous contact with the metal casing 12, which heat exchanger is fabricated of material having a heat conductivity factor greater than that of the metal forming the casing 12. For example, where the casing is of steel, the heat exchanger may be fabricated from aluminum. It will be apparent that a combination of the two above-described means may be effectively employed by constructing the vice means 44, such as illustrated in FIG. 4 of material having greater conductivity than the metal forming the casing.

As the laminate 16 is heated to soften the resinous lamina 18, the laminate 16 is coined to form the inner peripheral area with a flared-out of conoidal portion 62 by deflecting the inner peripheral area with a male or mandrel member 50 having a diameter substantially equal to that of the shaft 60 the seal is designed to mount. In the case where fluorocarbon material is employed, the coining mandrel 50 preferably has a diameter 1/32 inch greater than the shaft 60 to be mounted.

After the laminate 16 is coined, it is cooled to 80° F. or less while positioned on a mandrel or male member 64 having a diameter substantially equal to the diameter of the shaft 60 to be mounted by the seal 10. The time that the laminate 16 remains on the mandrel 64 is contingent upon the cooling medium employed. In any event, the laminate 16 should be cooled sufficiently, before removal, for the synthetic resinous lamina 18 to set. In those situations involving fluorocarbon lamina 18, a cold mandrel 64 (being at room temperature or less) is used and the fluorocarbon lamina is maintained on the cold mandrel for at least thirty seconds. If a fluid quench, dip or spray, is employed the time may be shortened.

In the preferred method of forming a composite laminate 16 of synthetic resin 18 and elastomer 20, the laminate annulus 16 is positioned over a "hot" mandrel 50 heated in the order to 450° F., and the laminate 16 is held thereon for 60 seconds. The "hot" mandrel 50 also serves as the forming or coining means. The "hot" mandrel 50 is removed and a "cold" mandrel 64 is inserted into the annulus 16 and held until the synthetic resinous lamina 18 sets.

In some cases, particularly whenever a heat source other than a hot mandrel 50 is employed, the cold mandrel 64, or even a third mandrel (not shown) heated or cold, may serve to coin or form the laminate 16 with a flared portion 62. It will also be apparent, although it comprises a substantially less satisfactory method, that a single mandrel may be employed to carry out the heating, forming and cold-setting functions. In such cases, a cold mandrel may be inserted into a laminate 16 to initially form the flared portion 64, the mandrel may then be brought up to a temperature to soften the synthetic resinous material 18 and cause it to flow sufficiently to obviate any wrinkles. The mandrel and the laminate 16 may then be cooled to set the synthetic resinous material 18.

In order to provide a further disclosure of preferred embodiments of the invention, the following data concerning the relative dimensions as shown in FIG. 10 and which contribute to the forming of the flared laminate portion 62 is presented:

| A | B | C |
| --- | --- | --- |
| Diameter of shaft to be mounted | Internal dimeter of laminate, before forming | Internal diameter of flange, toward which laminate is deflected in axial direction |
| 1 inch | A less 1/8 inch | A + 7/32 inch. |
| 1-2 inches | A less 5/32 inch | A + 7/32 inch. |
| 2-3 inches | A less 3/16 inch | A + 7/32 inch. |

In each case, the outside diameter of the laminate 16 need only be sufficiently greater than the dimension C to provide adequate area for the inner radial flange 34 to secure the laminate 16 within the casing 12.

The dimension C is considered to be important for the reason that it helps to determine the point of flexure, which point may not be necessarily at the flange end 66, when the laminate 16 is subject to deflection by the forming mandrel 50.

In FIG. 6 is illustrated the manner in which a plurality of seal assemblies 10 may be stacked on a single mandrel 50 to (a) simultaneously heat, or (b) simultaneously form, or (c) simultaneously cold set, a plurality of laminates 16, each laminate 16 being separately encased by a casing 12. It will be understood that more than one of the steps (a), (b) and (c) may be performed by a single mandrel 50 and that, as explained heretofore, the steps (a) and (b) need not be carried out in the recited sequential order.

In FIG. 8 is illustrated the manner in which a plurality of laminates 16 (three laminates are shown) in a single casing 12 may be subjected to the same steps as described above in conjunction with FIG. 6.

In order to provide a further and more complete disclosure, the inventor compared two seal assemblies having the same dimensions but fabricated according to different methods. The first seal assembly 10 was fabricated in accordance with the preferred method, heretofore described, and the laminate of this assembly 10 retained its uniformly concentric and smooth appearance, as illustrated in FIG. 8. In contrast, the second seal assembly, which was subjected only to "cold coining," soon lost its concentric conoidal shape and tended to revert to the original flat shape, as shown in FIG. 7. In the "cold coining" step employed with the second seal assembly, the laminate was positioned over a cold mandrel 64 in the same manner as in the cold-set step of the instant invention but was never subjected to elevated temperatures, to reduce the elastic memory of the fluorocarbon material.

It will be apparent that the instant invention provides a more simple and facile method for fabricating sealing assemblies which embody laminate sealing elements, comprising synthetic resinous or other material, which flows when subjected to elevated temperatures, and an elastomeric material, which may be deleteriously effected by such elevated temperatures. The instant invention overcomes the noted disadvantage of the resinous portion of such laminate sealing elements to retain their elastic memory and revert to a relatively flat configuration. The instant invention also accomplishes the stated objects, among which is the provision of a sealing assembly wherein concentricity of the elements is maintained.

It will be understood that the recited steps in the appended claims need not necessarily be carried out in the recited sequential order and that some of the steps may be simultaneously carried out.

What I claim:

1. The method of forming a sealing assembly comprising a synthetic resinous element backed with elastomer material and enclosed in an annular metal casing for mounting on a shaft, which method consists essentially of:
    (a) forming a laminate annulus comprising a layer of synthetic fluorocarbon resinous material with a layer of elastomer material, said layers of the annulus being aligned concentrically and having an interior diameter less than a shaft to be mounted;
    (b) encasing said annulus in an annular metal casing;
    (c) directing heat to the inner peripheral area of said annulus comprising a layer of synthetic resinous material with a layer of elastomer material and preferentially heating to a temperature in the range of about 250 to 500° F. and softening the inner periphery of the synthetic fluorocarbon resinous layer;
    (d) deflecting said heated inner peripheral area, while restraining the outer peripheral area, of said annulus by inserting a male member having a diameter slightly greater than the diameter of the shaft to be mounted by said element and in turn greater than the interior diameter of the annulus, through said annulus in an axial direction from the synthetic resinous side of said laminate annulus; and,
    (e) cooling said annulus while in the deflected position and while supported on a male member.

2. The method of forming a synthetic resinous element backed with elastomer material for mounting on a shaft of claim 1, wherein the heating and deflecting steps of (b) and (c) of claim 1 are effected with a first male member and the cooling step of (d) of claim 1 is effected on a second male member.

3. The method of forming a synthetic resinous element backed with elastomer material for mounting on a shaft of claim 2, wherein the first male member effects the heating and deflecting steps of (b) and (c) is of a diameter greater than the diameter of the shaft for mounting, and the second male member effecting the cooling step of (d) is of substantially the same diameter as the shaft for mounting.

4. The method of forming a synthetic resinous element backed with elastomer material for mounting on a shaft of claim 3, wherein the layer of synthetic resinous material is bonded to the layer of elastomer material.

5. The method of forming a sealing assembly comprising a synthetic resinous element backed with elastomer material and enclosed in an annular metal casing, and said sealing assembly being suitable for mounting on a shaft, which method consists essentially of:
   (a) forming a laminate annulus comprising a layer of synthetic fluorocarbon resinous material adhered to a layer of elastomer material, said layers of the annulus being aligned concentrically and having an interior diameter less than a shaft to be mounted;
   (b) encasing said annulus in an annular metal casing;
   (c) directing heat to the inner peripheral area of said annulus comprising a layer of synthetic resinous material with a layer of elastomer material and preferentially heating to a temperature in the range of about 250 to 500° F. and softening the inner periphery of the synthetic fluorocarbon resinous layer;
   (d) deflecting said heated inner peripheral area, while restraining an outer periperal area, of said annulus by inserting a male member having a diameter slightly greater than the diameter of the shaft to be mounted by said element and in turn greater than the interior diameter of the annulus, through said annulus in an axial direction from the synthetic resinous side of said laminate; and,
   (e) cooling said annulus while in the deflected position and while supported on a male member.

6. The method of forming shaped articles from a laminate annulus comprising inert synthetic fluorocarbon resinous material and elastomeric material adhered to each other and enclosed in an annular metal casing, which method consists essentially of:
   (a) supporting said laminate annulus on a mandrel heated to a temperature in the range of 250–500° F. to soften the inner periphery of the inert synthetic fluorocarbon resinous material;
   (b) deflecting an inner peripheral portion of said annulus to form a conical portion by positioning the inner peripheral portion of the annulus over said heated mandrel which is of larger diameter than the inner peripheral portion of said annulus;
   (c) retaining said annulus on the heated mandrel for at least 15 seconds; and (d) thereafter supporting said retained annulus on a mandrel having a surface temperature which does not exceed 80° F. and of a diameter larger than the inner peripheral portion of said annulus.

7. The method described in claim 6 wherein in step (d) said surface temperature does not exceed 80° F., for at least 60 seconds.

8. The method of forming a sealing device enclosed in an annular metal casing for mounting on a shaft, which method consists essentially of:
   (a) forming a laminate annulus having a layer of fluorocarbon material bonded to a layer of elastomer material, said annulus having an interior diameter less than a shaft to be mounted;
   (b) inserting said annulus in an annular metal casing having a radial flange portion with an interior diameter slightly greater than the diameter of the shaft to be mounted;
   (c) positioning the assembled inserted-annulus and metal casing within a holding means;
   (d) deflecting an inner peripheral area of said interior diameter of said annulus by inserting a first male member having a diameter slightly greater than the diameter of said shaft, through said annulus in an axial direction from a side of said laminate annulus having the fluorocarbon material, toward an opposite side of said laminate annulus having said elastomer material;
   (e) directing sufficient heat to said inner peripheral area of said annulus to heat said fluorocarbon material of said peripheral area to a temperature in the general range of about 450° F. and soften same; and,
   (f) cooling said annulus while in the deflected position and while supported on a second male member having a predetermined diameter corresponding substantially to the diameter of the shaft to be mounted, said cooling being sufficient that said second male member burnishes and irons out wrinkles on formed conoidal portions of said deflected annulus.

9. The method as described in claim 8 wherein the steps (d) and (e) are simultaneously carried out.

References Cited

UNITED STATES PATENTS 3,032,824   5/1962   Proud _____ 264—159

JOHN T. GOOLKASIAN, Primary Examiner

H. F. EPSTEIN, Assistant Examiner

U.S. Cl. X.R.

29—445, 511; 156—221, 224; 161—189, 221; 264—322; 277—184